(No Model.)

E. KEMPSHALL.
EYELET.

No. 551,970. Patented Dec. 24, 1895.

WITNESSES:
F. D. Harrison.
H. L. Robbins.

INVENTOR:
Eleazer Kempshall
by Wright Brown & Quinby
Attys.

UNITED STATES PATENT OFFICE.

ELEAZER KEMPSHALL, OF NEWTON, ASSIGNOR TO THEOPHILUS KING, TRUSTEE, OF QUINCY, MASSACHUSETTS.

EYELET.

SPECIFICATION forming part of Letters Patent No. 551,970, dated December 24, 1895.

Application filed September 30, 1895. Serial No. 564,072. (No model.)

*To all whom it may concern:*

Be it known that I, ELEAZER KEMPSHALL, of Newton, in the county of Middlesex and State of Massachusetts, have invented certain new and useful Improvements in Eyelets, of which the following is a specification.

This invention relates to eyelets the heads or exposed portions of which are covered with a material such as pyroxyline, which is molded upon the eyelet while in a plastic condition and subsequently becomes rigid.

The invention has for its object to provide certain improvements in eyelets of this class, whereby the molded head may be readily applied to the portion of the eyelet with which it comes in contact and will be securely engaged with the eyelet, so as to form an annular head of the desired form.

The invention consists in the improvements which I will now proceed to describe and claim.

Figure 1:
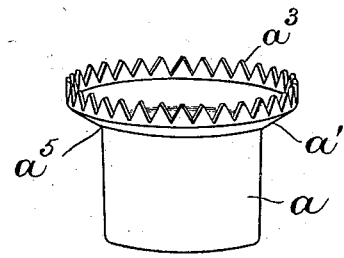
Figure 2:
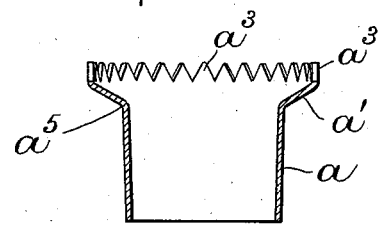
Figure 3:
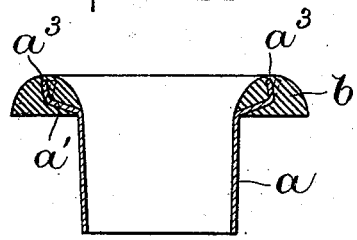
Figure 4:
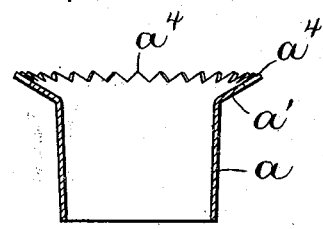
Figure 5:
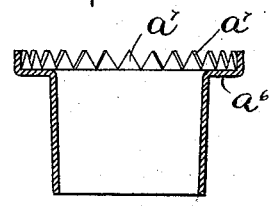

Of the accompanying drawings, forming a part of this specification, Figure 1 represents a perspective view of the metallic portion of my improved eyelet before the covering is applied. Fig. 2 represents a sectional view of the same. Fig. 3 represents a sectional view of my improved eyelet with the molded head or cover applied thereto. Fig. 4 represents a sectional view of a modification. Fig. 5 represents a sectional view of another modification.

In Figs. 1, 2, and 3, $a$ represents the body of my improved eyelet, and $a'$ the head or flange thereof, the said body being of cylindrical form and preferably slightly tapered, as shown, while the head or flange is beveled and increases in diameter from its junction with the body to its outer end, so that its inner and outer surfaces are inclined relatively to the body $a$, as shown. The marginal or upper portion of the flange $a'$ is notched to form a series of teeth or projections $a^3$, which are preferably turned upwardly at an angle to the flange $a'$.

$b$ represents the molded covering of pyroxyline or other suitable material adapted to be applied in a plastic state and to subsequently become rigid, said covering being molded upon the flange $a'$ and its teeth $a^3$, and having an annular form, its outer surface being preferably rounded or semicircular in cross-section, while its inner or under surface is preferably flat. In applying said covering, I first place the body $a$ of the eyelet in a hole which it closely fits in a die-plate, the flange $a'$ standing above said plate. A ring or annular blank of the covering material or composition is laid upon the points of the teeth $a^3$ of the flange, and then a die which is formed to enter the body of the eyelet and to mold the covering $b$ upon the flange $a'$ and teeth $a^3$ is moved downwardly, a projecting portion of said die entering the ring and pressing the material closely against the inner surface of the flange, while the marginal portion of the die co-operates with the die-plate in forming the outer portion of the covering $b$. The teeth or projections $a^3$ readily penetrate or divide the ring or blank from which the covering is made, causing its inner part to cover the inner surface of the flange, and its outer part to cover the outer surface of the flange and readily enter the space overhung by the inclined portion of the flange, so that the material is pressed closely against all parts of the outer surface of the flange, the result being a head that is perfectly formed at all parts.

The spaces between the teeth $a^3$ permit the material to move freely in a lateral direction or across the flange. At certain stages of the operation the pressure exerted in the material by the upper die gives it a tendency to move outwardly across the flange, this movement being permitted by the said spaces, which relieve the teeth from the pressure and prevent them from being unduly bent outwardly or downwardly.

The teeth when bent upwardly from the flange, as shown in Figs. 1, 2, and 3, increase the security of the connection between the flange and the cover, because they are slightly bent or inclined by the pressure of the material against them and are thus interlocked with the cover. I find that in practice some of the teeth are inclined outwardly and some inwardly, as shown by full and dotted lines in Fig. 3.

In Fig. 4 I show teeth $a^4$, inclined in continuation of the flange, said teeth affording a similar advantage—that is to say, they permit the material to flow freely in a downward direction across the flange, and at the same time increase the security of the connection between the flange and cover.

I prefer the arrangement shown in Figs. 1, 2, and 3, because the teeth thus arranged penetrate the material more advantageously.

The flange joins the body of the eyelet at an obtuse angle $a^5$, which forms a shoulder at the lower end of the flange, said shoulder bearing on the die-plate above referred to, and causing said plate to firmly support the flange with its upper edge parallel with the die-plate, the said shoulder also preventing the eyelet from being wedged or crowded down into the body-receiving cavity in said plate.

In Fig. 5 I show an eyelet having a flange $a^6$ extending outwardly about at a right angle with the tubular portion $a$, and provided at its margin with upwardly-projecting teeth $a^7$.

I claim—

1. An eyelet comprising a tubular body, a flange formed on one end of said body, and a series of teeth or projections formed on the said flange and separated by intervening spaces, as set forth.

2. An eyelet comprising a tubular body, a flange formed on one end of said body, a series of teeth or projections formed on the said flange and separated by intervening spaces, and an annular covering molded on said lip and flange, the teeth being formed to penetrate the mass of covering composition while the latter is being forced down onto the flange, and to permit a movement of the material between the teeth, as set forth.

In testimony whereof I have signed my name to this specification, in the presence of two subscribing witnesses, this 6th day of September, A. D. 1895.

ELEAZER KEMPSHALL.

Witnesses:
C. F. BROWN,
A. D. HARRISON.